US012792003B2

(12) United States Patent
Esaki et al.

(10) Patent No.: US 12,792,003 B2
(45) Date of Patent: Nov. 10, 2026

(54) CONTROL SYSTEM, PROCESSING DEVICE, AND CONTROL METHOD

(71) Applicant: MITSUBISHI HEAVY INDUSTRIES, LTD., Tokyo (JP)

(72) Inventors: Masatoshi Esaki, Tokyo (JP); Hiroyasu Ishigaki, Tokyo (JP); Kazuhiro Domoto, Tokyo (JP); Naoyuki Nagafuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 465 days.

(21) Appl. No.: 18/284,358

(22) PCT Filed: Mar. 23, 2022

(86) PCT No.: PCT/JP2022/013514
§ 371 (c)(1),
(2) Date: Jan. 4, 2024

(87) PCT Pub. No.: WO2022/210167
PCT Pub. Date: Oct. 6, 2022

(65) Prior Publication Data

US 2024/0160182 A1 May 16, 2024

(30) Foreign Application Priority Data

Mar. 31, 2021 (JP) ................................ 2021-062223

(51) Int. Cl.
*G05B 19/408* (2006.01)
*G05B 19/418* (2006.01)

(52) U.S. Cl.
CPC ....... *G05B 19/408* (2013.01); *G05B 19/4185* (2013.01); *G05B 2219/36542* (2013.01)

(58) Field of Classification Search
CPC . G05B 19/408; G05B 19/4185; H04L 9/0825; H04L 9/3239; H04L 9/3247; H04L 9/40
See application file for complete search history.

(56) References Cited

U.S. PATENT DOCUMENTS 10,834,094 B2 * 11/2020 Galpin .................. H04L 9/3247
2002/0116083 A1 * 8/2002 Schulze .................. H10P 74/23
700/121

(Continued)

FOREIGN PATENT DOCUMENTS

CN 104993981 A 10/2015
CN 111630812 A 9/2020

(Continued)

OTHER PUBLICATIONS

International Search Report dated Jun. 14, 2022, issued in counterpart International Application No. PCT/JP2022/013514, with English Translation. (4 pages).

(Continued)

*Primary Examiner* — Mong-Shune Chung
(74) *Attorney, Agent, or Firm* — WHDA, LLP

(57) ABSTRACT

A control system controls a control object device on the basis of control information using a control device and includes: a conversion unit configured to convert an imaging signal obtained by capturing an image generated on the basis of pre-conversion input information which is input information including the control information to the input information and to output post-conversion input information; and a transmission unit configured to transmit the control information included in the post-conversion input information to the control device.

9 Claims, 11 Drawing Sheets

(56) References Cited

U.S. PATENT DOCUMENTS

| | | | | |
|---|---|---|---|---|
| 2005/0230475 | A1 | 10/2005 | Sato et al. | |
| 2019/0205865 | A1 | 7/2019 | Jamkhedkar et al. | |
| 2019/0266372 | A1* | 8/2019 | Ushiki | H04L 9/3226 |
| 2020/0033839 | A1* | 1/2020 | Messinger | G05B 19/4183 |
| 2021/0080935 | A1 | 3/2021 | Kono et al. | |
| 2022/0091591 | A1* | 3/2022 | Miller | G05B 19/4185 |
| 2022/0308555 | A1* | 9/2022 | Malm | G06K 7/1417 |

FOREIGN PATENT DOCUMENTS

| | | | | |
|---|---|---|---|---|
| CN | 111788594 | A | 10/2020 | |
| JP | H04-216111 | A | 8/1992 | |
| JP | 2005-309481 | A | 11/2005 | |
| JP | 2009-75758 | A | 4/2009 | |
| JP | 4960818 | B2 | 6/2012 | |
| JP | 2016-059210 | A | 4/2016 | |
| JP | 2020-52938 | A | 4/2020 | |
| JP | 2020-64670 | A | 4/2020 | |
| JP | 2021-34939 | A | 3/2021 | |
| TW | I460662 | B | 11/2014 | |
| WO | 2015/092817 | A1 | 6/2015 | |
| WO | WO-2019138668 | A1 * | 7/2019 | H04L 9/50 |

OTHER PUBLICATIONS

Written Opinion of the International Searching Authority (Form PCT/ISA/237) dated Jun. 14, 2022, issued in counterpart International Application No. PCT/JP2022/013514, w/English Translation. (8 pages).

* cited by examiner

CONTROL SYSTEM, PROCESSING DEVICE, AND CONTROL METHOD

TECHNICAL FIELD

The present disclosure relates to a control system, a processing device, and a control method. Priority is claimed on Japanese Patent Application No. 2021-062223, filed Mar. 31, 2021, the content of which is incorporated herein by reference.

BACKGROUND ART

Since control devices for power plants which are examples of industrial plants have to have high reliability in view of stable supply of electric power or the like, even a secure communication line thereof is connected via a network (Internet) and thus it cannot be said that the likelihood of unexpected unauthorized access thereto is zero. Accordingly, based on security policies of power companies, communication from a cloud to a control network is not often permitted even for the secure communication lines. In such a case, an offline method of receiving a data file into a control device through a manual operation such as manual inputting or recording media is required, and operation parameters cannot be changed in real time (for example, Patent Literature 1).

CITATION LIST

Patent Literature

[Patent Literature 1]
Japanese Unexamined Patent Application, First Publication No. 2020-64670

SUMMARY OF INVENTION

Technical Problem

For example, in a method of transmitting data through a manual operation using a recording medium as described in the background art of Patent Literature 1, there is a problem in that the method is troublesome or takes time.

The present disclosure was made to solve the aforementioned problem and an objective thereof is to provide a control system, a processing device, and a control method that can reduce time and effort.

Solution to Problem

In order to achieve the aforementioned objective, a control system according to the present disclosure is a control system that controls a control object device on the basis of control information using a control device, the control system including: a conversion unit configured to convert an imaging signal obtained by capturing an image generated on the basis of pre-conversion input information which is input information including the control information to the input information and to output post-conversion input information; and a transmission unit configured to transmit the control information included in the post-conversion input information to the control device.

A processing device according to the present disclosure is a processing device provided in a control system that controls a control object device on the basis of control information using a control device, the processing device including: a conversion unit configured to convert an imaging signal obtained by capturing an image generated on the basis of pre-conversion input information which is input information including the control information to the input information and to output post-conversion input information; and a transmission unit configured to transmit the control information included in the post-conversion input information to the control device.

A control method according to the present disclosure is a control method of controlling a control object device on the basis of control information using a control device, the control method including: a step of converting an imaging signal obtained by capturing an image generated on the basis of pre-conversion input information which is input information including the control information to the input information and outputting post-conversion input information; and a step of transmitting the control information included in the post-conversion input information to the control device.

Advantageous Effects of Invention

With the control system, the processing device, and the control method according to the present disclosure, it is possible to reduce time and effort.

DESCRIPTION OF EMBODIMENTS

First Embodiment

Figure 1:
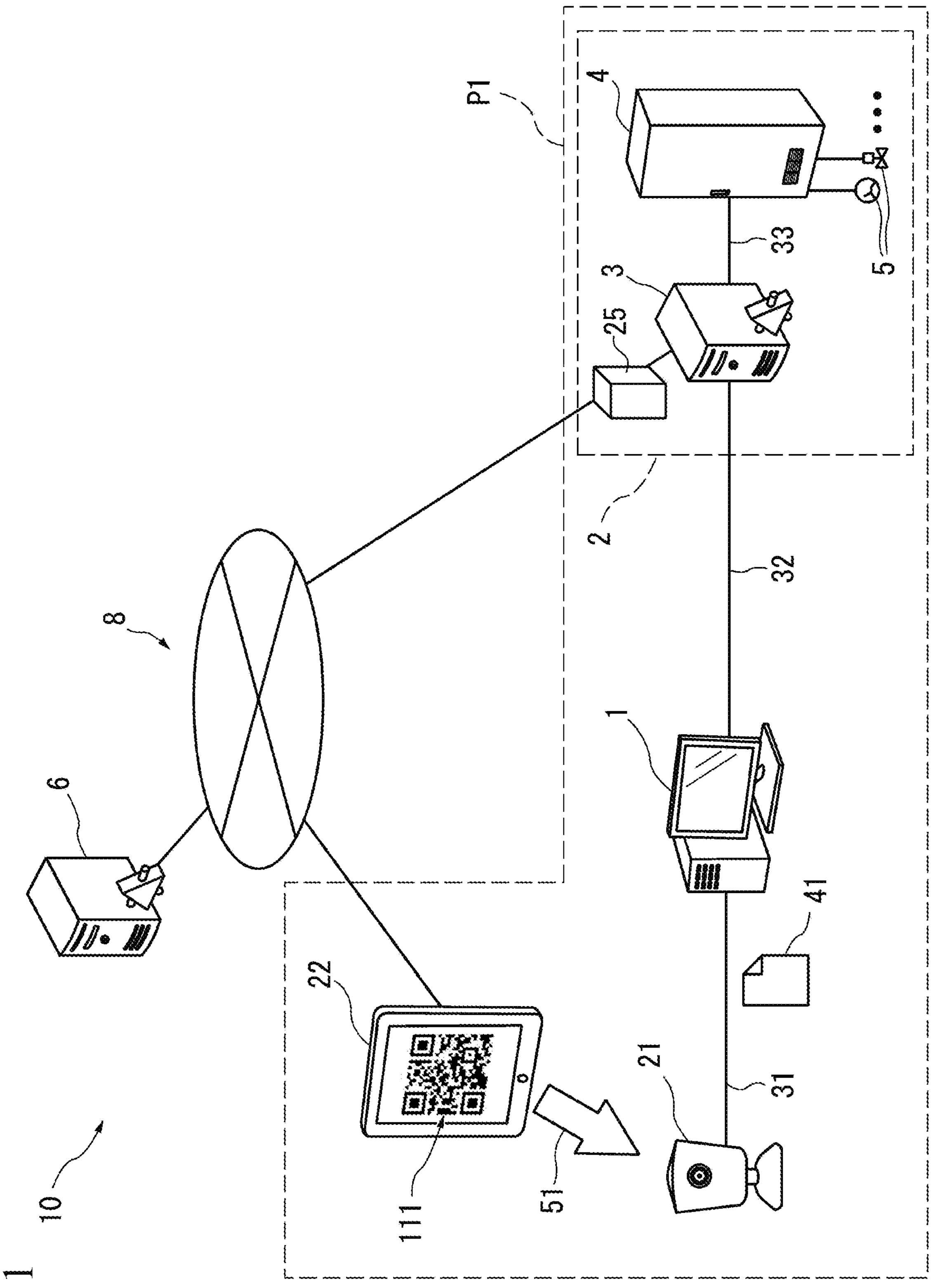
FIG. 1 is a diagram illustrating an example of a configuration of a control system according to a first embodiment of the present disclosure.
Figure 2:
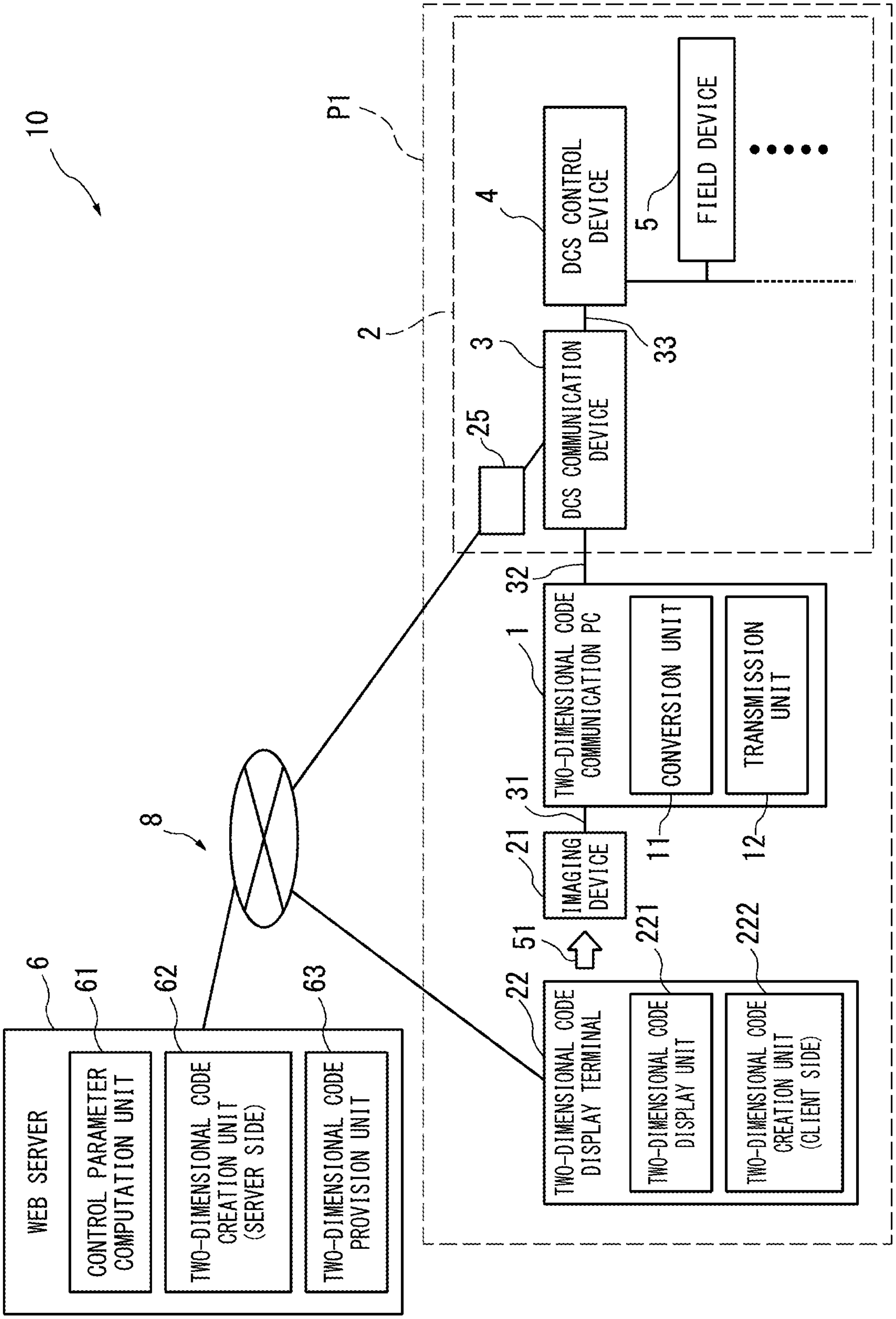
FIG. 2 is a block diagram illustrating an example of a functional configuration of a control system 10 illustrated in FIG. 1.
Figure 3:
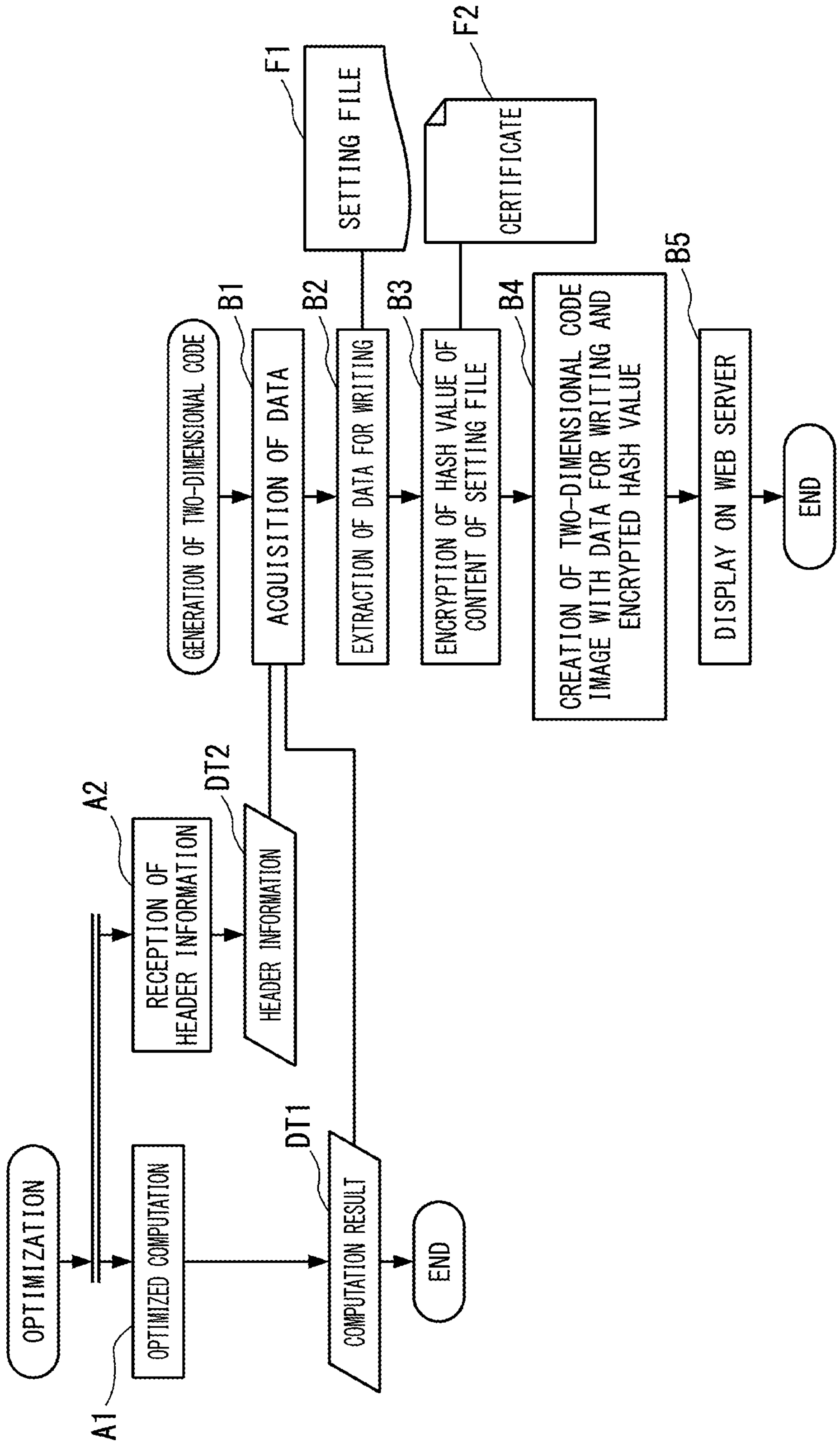
FIG. 3 is a flowchart illustrating an operation example of the control system 10 illustrated in FIGS. 1 and 2.
Figure 4:
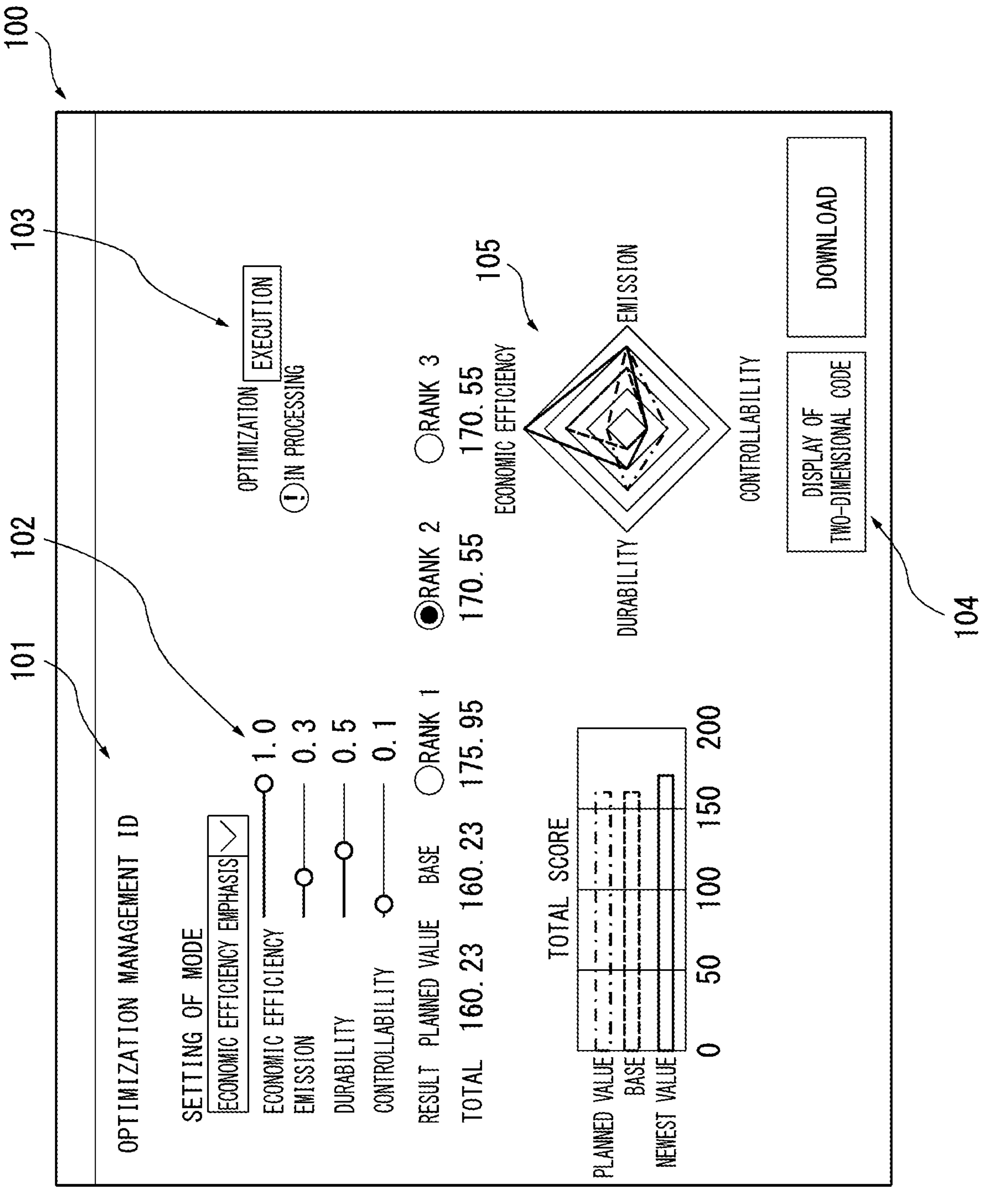
FIG. 4 is a diagram schematically illustrating an example of a display screen of a two-dimensional code display terminal 22 illustrated in FIGS. 1 and 2.
Figure 5:
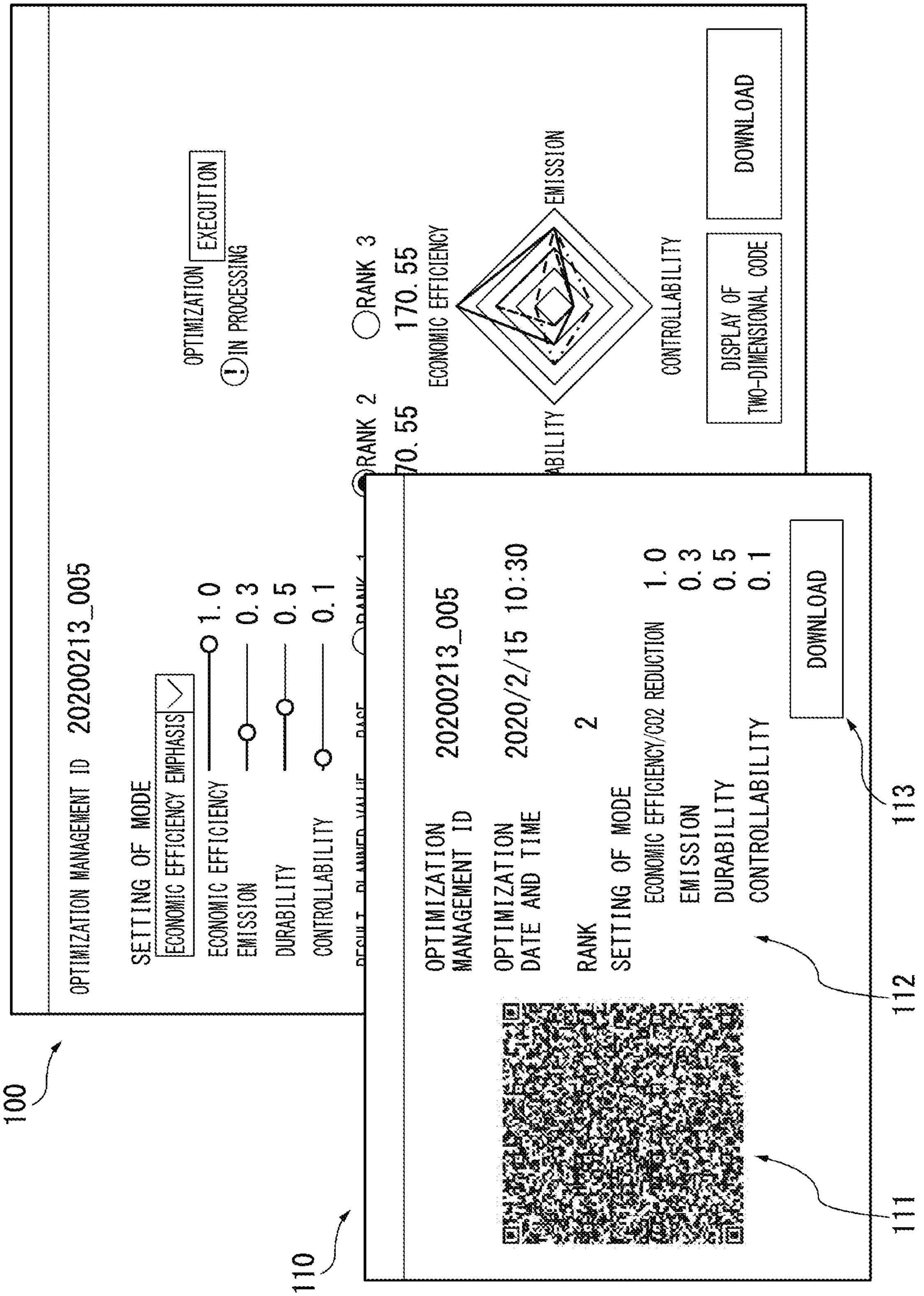
FIG. 5 is a diagram schematically illustrating an example of a display screen of the two-dimensional code display terminal 22 illustrated in FIGS. 1 and 2.
Figure 6:
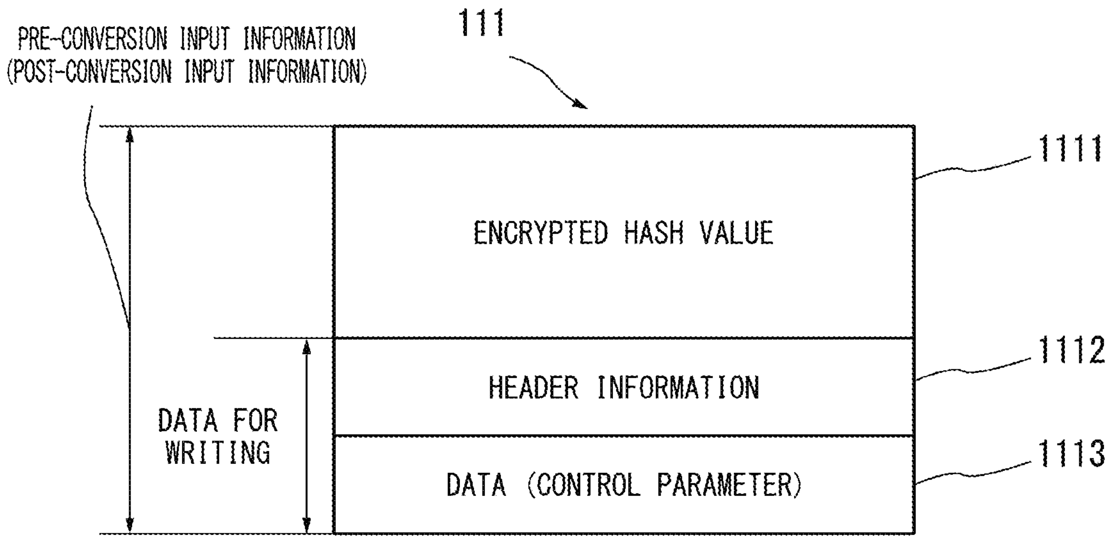
FIG. 6 is a diagram schematically illustrating an example of a data structure of a two-dimensional code 111 illustrated in FIG. 5.
Figure 7:
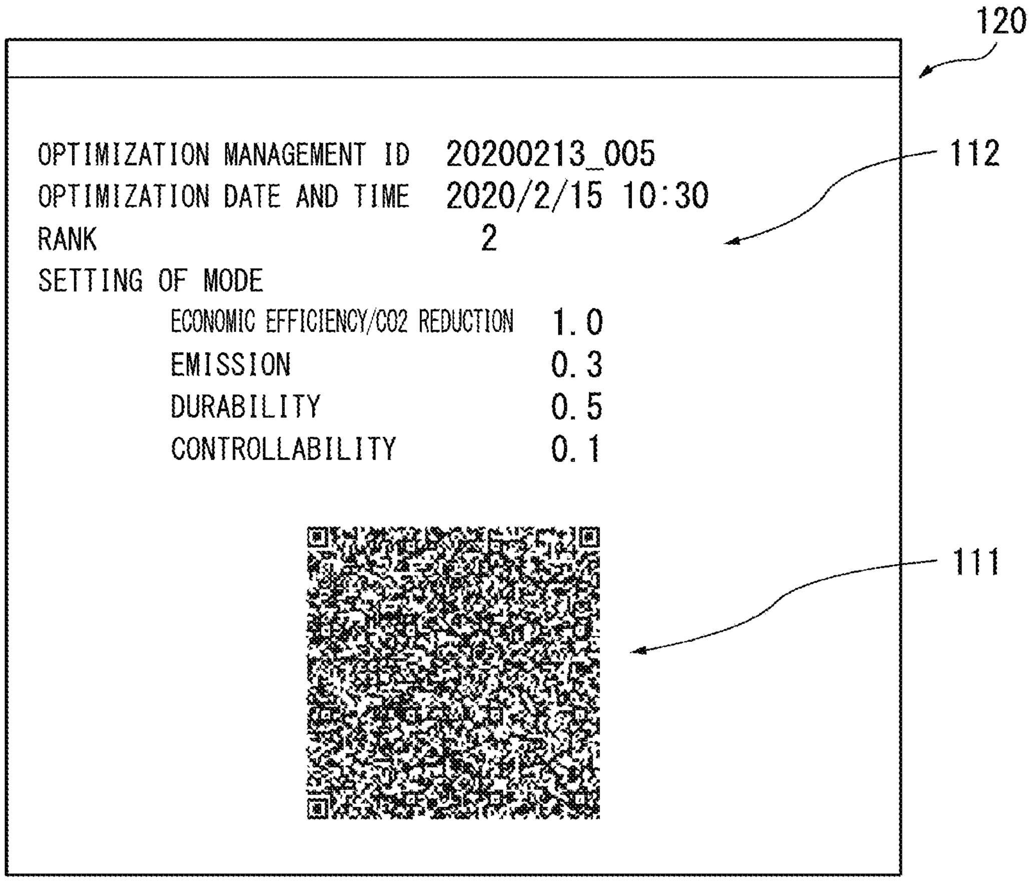
FIG. 7 is a diagram schematically illustrating an example of a display screen of the two-dimensional code display terminal 22 illustrated in FIGS. 1 and 2.
Figure 8:
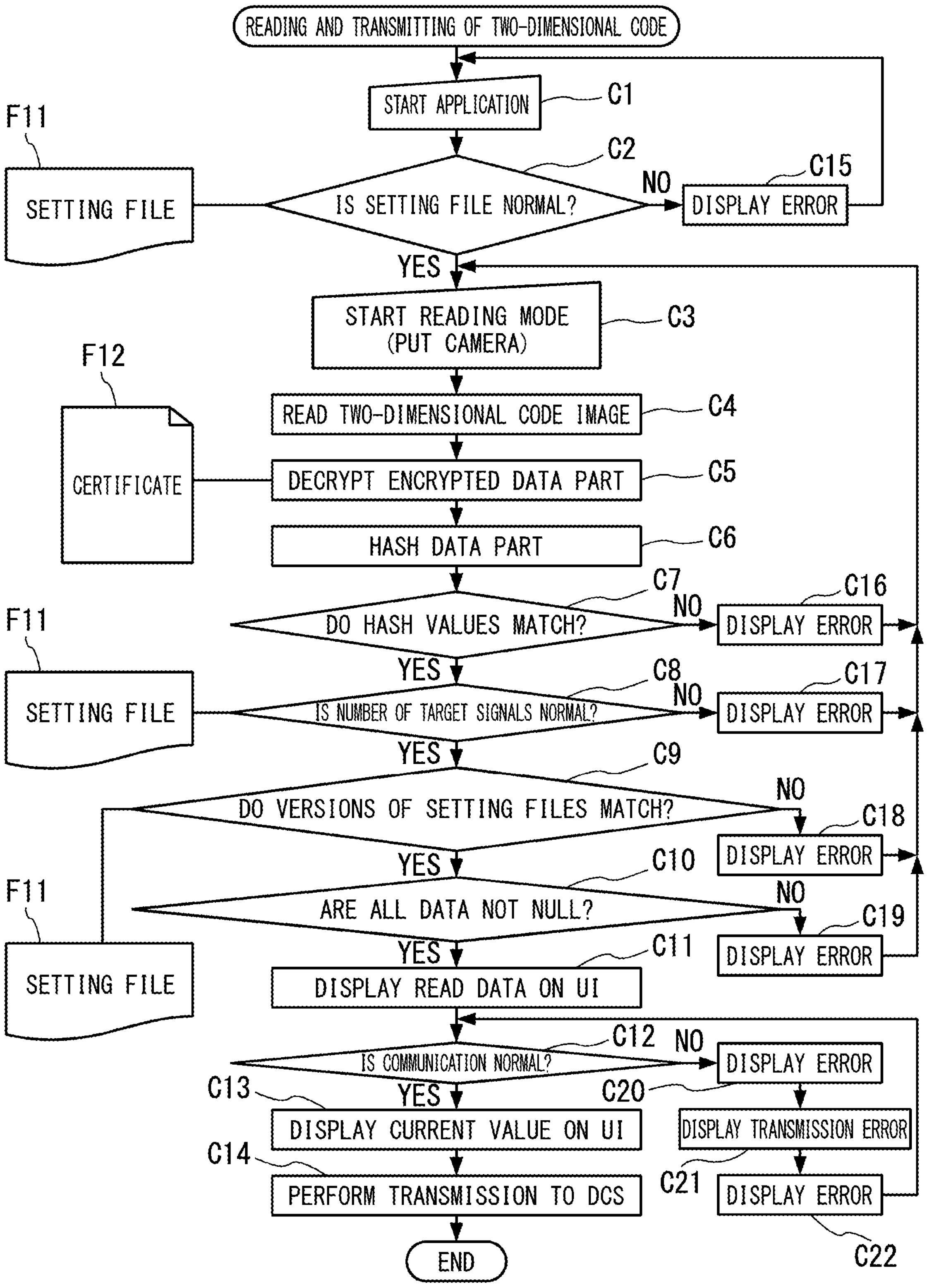
FIG. 8 is a flowchart illustrating an operation example of a two-dimensional code communication PC 1 illustrated in FIGS. 1 and 2.
Figure 9:
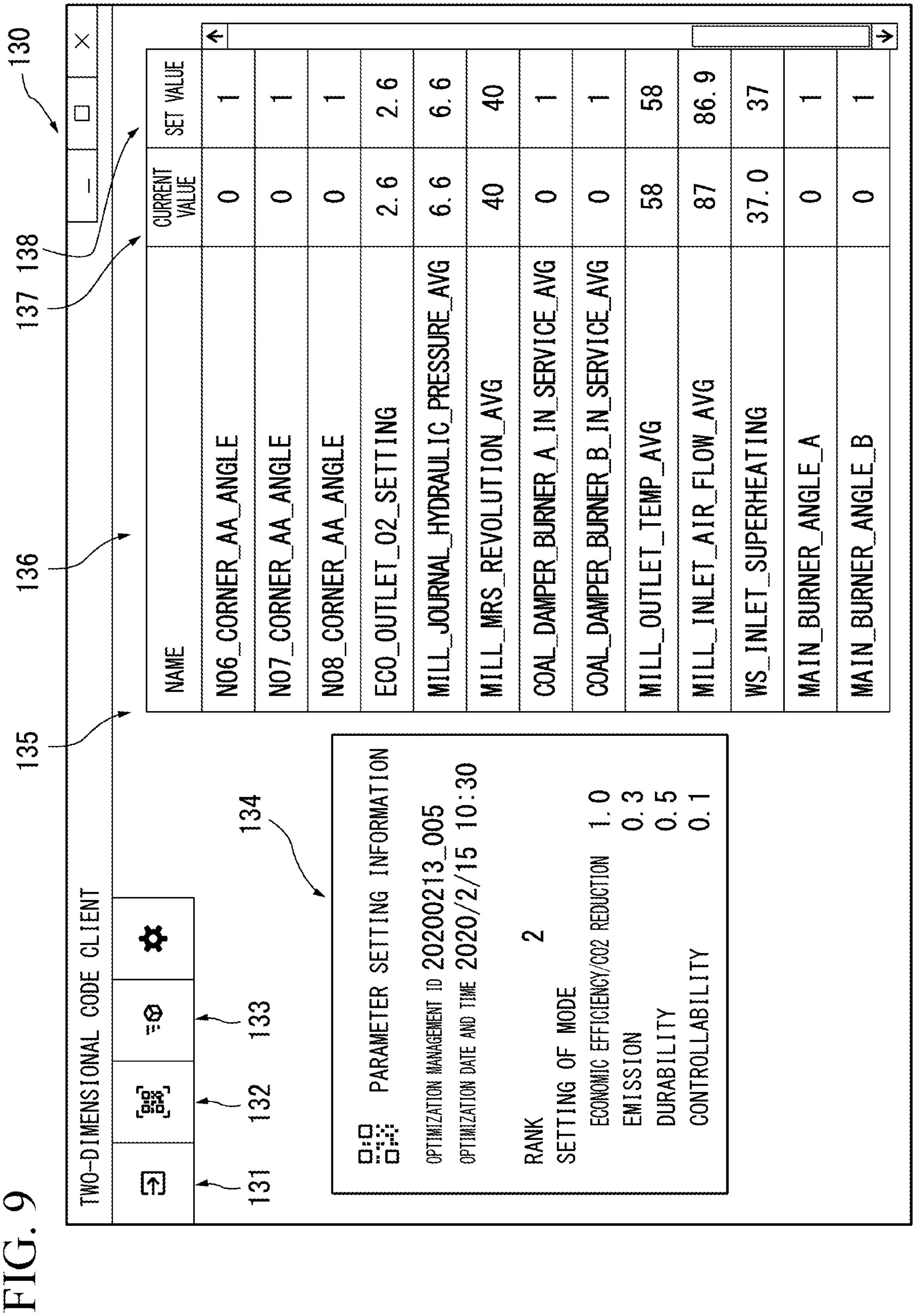
FIG. 9 is a diagram schematically illustrating an example of a display screen of the two-dimensional code communication PC 1 illustrated in FIGS. 1 and 2.
Figure 10:
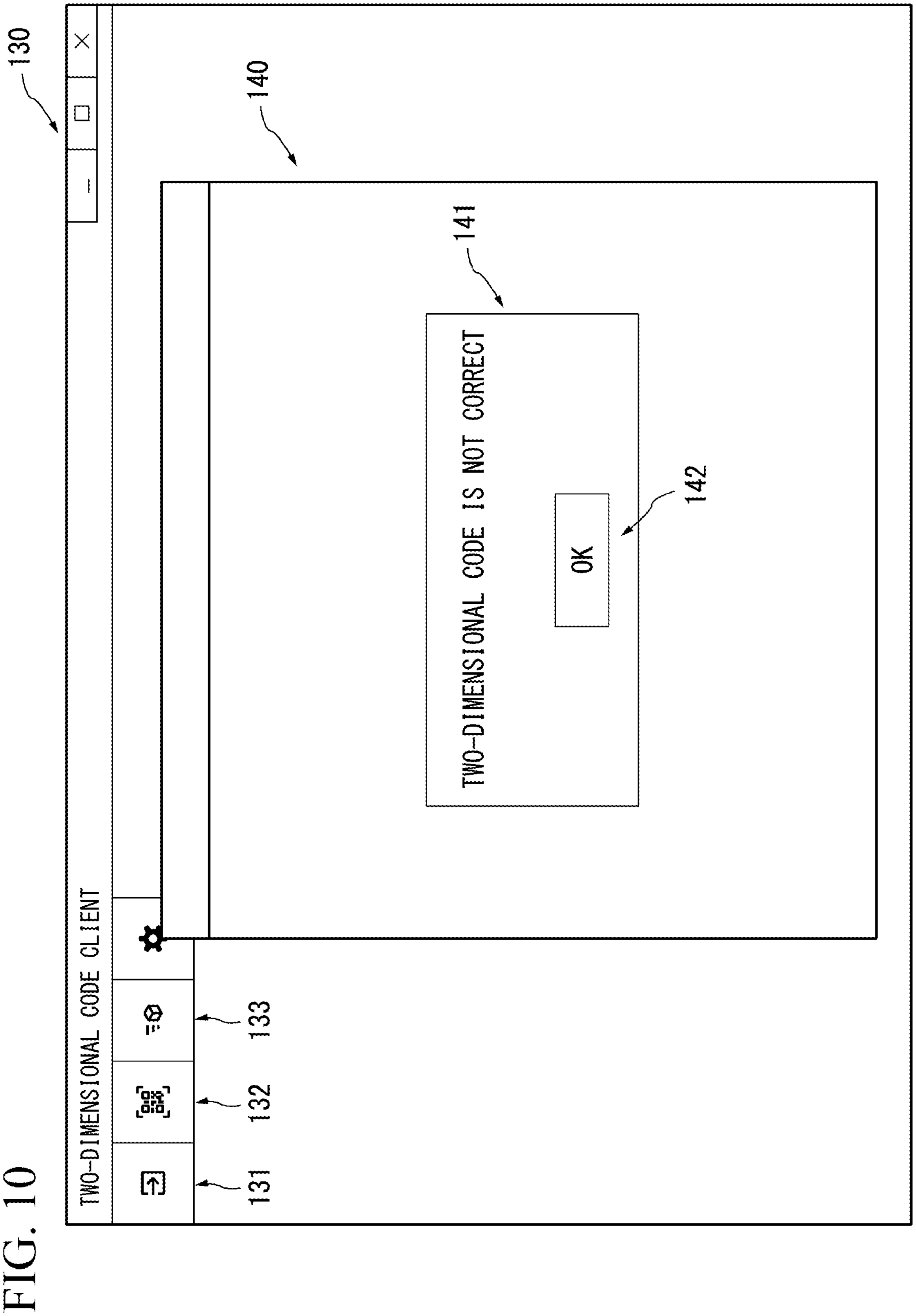
FIG. 10 is a diagram schematically illustrating an example of a display screen of the two-dimensional code communication PC 1 illustrated in FIGS. 1 and 2.

Hereinafter, a control system, a processing device, and a control method according to a first embodiment of the present disclosure will be described with reference to FIGS. 1 to 10. FIG. 1 is a diagram illustrating an example of a configuration of a control system according to a first embodiment of the present disclosure. FIG. 2 is a block diagram illustrating an example of a functional configuration of a control system 10 illustrated in FIG. 1. FIG. 3 is a flowchart illustrating an operation example of the control system 10 illustrated in FIGS. 1 and 2. FIGS. 4 and 5 are diagrams schematically illustrating an example of a display screen of a two-dimensional code display terminal 22 illustrated in FIGS. 1 and 2. FIG. 6 is a diagram schematically illustrating an example of a data structure of a two-dimensional code 111 illustrated in FIG. 5. FIG. 7 is a diagram schematically illustrating an example of a display screen of the two-dimensional code display terminal 22 illustrated in FIGS. 1 and 2. FIG. 8 is a flowchart illustrating an operation example of a two-dimensional code communication PC 1 illustrated in FIGS. 1 and 2. FIGS. 9 and 10 are diagrams schematically illustrating an example of a display screen of the two-dimensional code communication PC 1 illustrated in FIGS. 1 and 2. The same or corresponding elements in the drawings will be referred to by the same reference signs and description thereof will be appropriately omitted.

(Configuration of Control System)

The control system 10 illustrated in FIG. 1 is, for example, a control system for an industrial plant P1 such as a power plant and includes a two-dimensional code communication PC 1 (an example of a processing device), a distributed control system 2, an imaging device 21, a two-dimensional code display terminal 22, and a web server 6. The distributed control system 2 includes a distributed control system (DCS) communication device 3, a DCS control device 4 (an example of a control device), a plurality of field devices 5 (an example of a control object device) such as a sensor and actuator provided in a power generation unit or the like which is not illustrated, and a data diode device 25. The two-dimensional code communication PC 1, the imaging device 21, and the two-dimensional code display terminal 22 are installed and operated in the industrial plant P1.

The DCS communication device 3 controls communication via an information communication network 8 such as the Internet, communication such as MHI card communication (Mitsubishi Heavy Industries Communication with Agents for Redundant and Distributed network) and OPC (Object Linked and Embedding for Process Control) communication via a communication network 32, and communication via a control network 33. The two-dimensional code display terminal 22 can access the web server 6 via the information communication network 8. The web server 6 can acquire information such as measured values of the field devices 5 or the like from the DCS communication device 3 via the information communication network 8 and the data diode device 25. The two-dimensional code communication PC 1 and the DCS communication device 3 transmit and receive predefined information via the communication network 32. The imaging device 21 and the two-dimensional code communication PC 1 are connected via a universal serial bus 31. The DCS communication device 3 and the DCS control device 4 are connected via the control network 33. The data diode device 25 is also called a one-way security gateway, cuts off reverse attack communication while enabling transmission of data through physical one-way communication from the distributed control system 2 (a transmitting-side network) to the information communication network 8 (a receiving-side network), and protects the transmitting-side network. The data diode device 25 may be connected to the DCS control device 4.

The imaging device 21 captures a two-dimensional code (image) 111 displayed on the two-dimensional code display terminal 22 and outputs an imaging signal 41 obtained by imaging the two-dimensional code 111 to the two-dimensional code communication PC 1. In this case, no physical communication network is present between the two-dimensional code display terminal 22 and the imaging device 21, but a one-way relationship 51 such that the imaging device 21 images the two-dimensional code 111 displayed on the two-dimensional code display terminal 22 is present therebetween. No signal transmission means from the two-dimensional code communication PC 1 to the two-dimensional code display terminal 22 is provided. The imaging device 21 may form a unified body along with the two-dimensional code communication PC 1 (for example, be incorporated into the two-dimensional code communication PC 1).

As illustrated in FIG. 2, the web server 6 includes a control parameter computation unit 61, a two-dimensional code creation unit (server side) 62, and a two-dimensional code provision unit 63 as functional constituents formed by combination of a computer constituting the web server 6 and peripherals thereof with software such as programs which are executed by the computer. The two-dimensional code display terminal 22 is, for example, an information terminal such as a tablet terminal, a smartphone, or a PC and similarly includes a two-dimensional code display unit 221 and a two-dimensional code creation unit (client side) 222 as functional constituents. The two-dimensional code communication PC 1 similarly includes a conversion unit 11 and a transmission unit 12 as functional constituents. The web server 6 can be configured, for example, using cloud computing.

The control parameter computation unit 61 computes an optimal solution of one or more control parameters (an example of control information) satisfying given conditions using a plant model or a digital twin for simulating performance and conditions of the industrial plant P1. The control parameters are, for example, target values, instruction values, upper limit and lower limit values, and a value (information) for instructing selection of control details or the like in feedback control, sequence control, or open-loop control associated with the field devices 5 such as actuators. The given conditions are, for example, operating conditions such as those with economic efficiency emphasis and emphasis of exhaust gas (emission) concentration suppression of environmentally regulated substances. The control parameter computation unit 61 acquires measurement results of the field devices 5 such as sensors in the distributed control system 2 via the data diode device 25 and the DCS communication device 3 and computes optimal solutions of the control parameters on the basis of newest information. The control parameter computation unit 61 is a web application and computes the control parameters using the two-dimensional code creation unit (client side) 222 provided in the two-dimensional code display terminal 22 as a client-side application. The control parameter computation unit 61 has a function of performing a process of authenticating a user or performing a process of selecting a target industrial plant P1 or the like. The authentication process, the process of selecting an industrial plant P1, and the like may be performed by, for example, another system managing the web server 6, and an access to the control parameter computation unit 61 may be performed after the other system has performed the authentication process or the selection process.

The two-dimensional code creation unit (server side) 62 creates a two-dimensional code on the basis of input information (hereinafter referred to as pre-conversion input information) including the control parameters computed by the control parameter computation unit 61. The input information is, for example, information including data indicating one or more control parameters, header information indicating creation date and times of the control parameters, and information obtained by encrypting a hash value of the data. The two-dimensional code creation unit (server side) 62 is a web application and creates a two-dimensional code using the two-dimensional code creation unit (client side) 222 provided in the two-dimensional code display terminal 22 as a client-side application. A two-dimensional code is, for example, an image in which square unit figures are arranged in both of a vertical direction and a horizontal direction. An example of such a two-dimensional code is a QR code (registered trademark) which is an example of a matrix code. The two-dimensional code is not limited to a matrix code and may be, for example, a stack code.

The two-dimensional code provision unit 63 is a web application, operates using the two-dimensional code creation unit (client side) 222 provided in the two-dimensional code display terminal 22 as a client-side application, and provides the two-dimensional code created by the two-dimensional code creation unit (server side) 62 as a web page which can be accessed with a predetermined uniform resource locator (URL) to the two-dimensional code display unit 221 (the two-dimensional code display unit 221 can be made to access the two-dimensional code via the information communication network 8 and to display the two-dimensional code).

The two-dimensional code display unit 221 is, for example, a universal browser application and displays the two-dimensional code 111 on a display screen of the two-dimensional code display terminal 22 by accessing a predetermined URL on the web server 6 in accordance with a user's instruction.

On the other hand, the two-dimensional code creation unit (client side) 222 is, for example, a universal browser application, and causes the control parameter computation unit 61 to computer optimal solutions of one or more control parameters, causes the two-dimensional code creation unit (server side) 62 to create a two-dimensional code, and causes the two-dimensional code provision unit 63 to provide a web page including the two-dimensional code in response to a user's input operation to the two-dimensional code display terminal 22.

The conversion unit 11 converts (decrypts) the imaging signal 41 obtained by capturing the two-dimensional code 111 generated on the basis of the pre-conversion input information and displayed on the two-dimensional code display terminal 22 with the imaging device 21 to the same input information (hereinafter referred to as post-conversion input information) as the pre-conversion input information and outputs the post-conversion input information.

The transmission unit 12 transmits one or more control parameters included in the post-conversion input information to the DCS control device (a control device) 4 via the DCS communication device 3.

The DCS control device 4 is a device that performs monitoring, feedback control, sequence control, open-loop control, and the like of a plurality of field devices 5 directly or via a programmable logic controller (PLC) which is not illustrated and, for example, serves to receive one or more control parameters from the transmission unit 12 and to control the plurality of field devices 5 which are control object devices on the basis of the received one or more control parameters.

(Operation Example of Control System)

(At the Time of Creation of Two-Dimensional Code)

FIG. 3 illustrates an operation example of the control system 10 (the web server 6) illustrated in FIGS. 1 and 2. FIGS. 4 and 5 schematically illustrate an example of the display screen of the two-dimensional code display terminal 22 illustrated in FIGS. 1 and 2.

In optimized computation (A1) and header information reception (A2) illustrated in FIG. 3, the control parameter computation unit 61 and the two-dimensional code creation unit (client side) 222 illustrated in FIG. 2 perform a predetermined authentication process and a process of selecting a target industrial plant P1 or the like in response to a user's input operation to the two-dimensional code display terminal 22 and then display a window 100 illustrated in FIG. 4 on the display screen of the two-dimensional code display terminal 22. The window 100 displays an "optimization management ID (identifier)" 101 which is identification information of a control parameter, optimization mode setting information 102, and the like. In this example, an optimization mode is set as balance of four items including economic efficiency (emphasis of balance between economic efficiency and reduction of an amount of exhaust such as carbon dioxide), emission, durability, and controllability. When a user performs mode setting on the window 100 and then clicks a button "execution" 103 with a pointer, the control parameter computation unit 61 computes, for example, first to third optimal solutions in the order of evaluation points (A1 and A2), and the two-dimensional code creation unit (server side) 62 creates a two-dimensional code image (B1 to B4). In this case, when computation of the optimal solutions has been completed, total scores of the computation results of the first to third ranks in the order of evaluation points are displayed as "rank 1," "rank 2," and "rank 3" on the basis of predetermined evaluation points as illustrated in FIG. 4. When the user ascertains balance of four items from, for example, a radar chart 105 and clicks a button "display of two-dimensional code" 104 in a state in which "rank 2" has been selected, the two-dimensional code creation unit (server side) 62 and the two-dimensional code display terminal 22 displays a window 110 on the display screen of the two-dimensional code display terminal 22 as illustrated in FIG. 5. In computing the optimal solutions, the control parameter computation unit 61 determines data (computation result) DT1 indicating one or more control parameters and header information DT2 including information indicating a creation date and time of the control parameter for the first to third evaluation points. The header information DT2 includes, for example, information such as a creation date and time of a control parameter, an optimization management ID ("20200213_005"), item values of mode settings ("1.0," "0.3," "0.5," and "0.1"), and a value ("2") of the selected rank. The header information may include, for example, information indicating a version of a setting file F1 which will be described later and an encrypted value of a hash value of content (data (such as sources or text) in the setting file F1) of the setting file F1.

In (B1) to (B4), first, the two-dimensional code creation unit (server side) 62 acquires data DT1 and header information DT2 determined by the control parameter computation unit 61 (B1), extracts necessary "data for writing" from the data DT1 and the header information DT2, for example, by deleting unnecessary data or the like included in the data DT1 and the header information DT2 with reference to the setting file F1 (B2), computes a hash value of content of the setting file F1 and additionally encrypts the computed hash value using an encryption key of a predetermined digital certificate F2 (B3). Combined information of the "data for writing" and information obtained by encrypting the hash value is the pre-conversion input information. The encrypted hash value included in the two-dimensional code is not limited to an encrypted value of the hash value of content of the setting file F1, but may be an encrypted value of a hash value of a whole or part of the data DT1 or the header information DT2 in addition to or instead of the content of the setting file F1. In the following description, a whole or part of the data DT1 or the header information DT2 included in the content of the setting file F1 or the pre-conversion input information is referred to as "predetermined information."

Here, the setting file F1 includes the number of control parameters in the pre-conversion input information and information in which the listing order of the control parameters is defined. The setting file F1 may additionally include information indicating a name (such as a point number name) corresponding to each control parameter and an ID (an identification code) (such as point number ID) corresponding to each control parameter in the distributed control system 2 (or the DCS control device 4). By using this setting file F1, for example, a name and a value of each control parameter can be correlated with reference to the setting file F1 even when information for defining names of the control parameters is omitted from the pre-conversion input information for the values of the control parameters. That is, even when the pre-conversion input information includes only a value of each control parameter, it is possible to identify the name of each value or the like by referencing to the setting file F1 when decrypting the pre-conversion input information and computing the post-conversion input information. By causing the setting file F1 to be shared by the creation side and the decryption side of a two-dimensional code, it is possible to reduce an amount of data of the pre-conversion input information. In this embodiment, it is assumed that the setting file F1 includes information indicating a creation version. The setting file F1 can be used to correlate communication destinations in the communication network 32.

Then, the two-dimensional code creation unit (server side) 62 creates a two-dimensional code image of the data for writing and the encrypted hash value, and the two-dimensional code creation unit (server side) 62 and the two-dimensional code display terminal 22 display the window 110 illustrated in FIG. 5 on the display screen of the two-dimensional code display terminal 22 (B4). The window 110 illustrated in FIG. includes a two-dimensional code 111 and header information 112. As illustrated in FIG. 6, the two-dimensional code 111 includes information indicating an encrypted hash value 1111, header information 1112, and data (one or more control parameters) 1113. Combined information of the header information 1112 and the data 1113 is "data for writing" extracted in (B2), and combined information of the encrypted hash value 1111, the header information 1112, and the data 1113 is "pre-conversion input information." "Post-conversion input information" has the same format as the "pre-conversion input information." The header information 1112 may include a whole or part of the encrypted value of the hash value of the setting file F1.

Then, when the user clicks a button "download" 113 on the window 110 illustrated in FIG. 5, the two-dimensional code provision unit 63 sets a web page 120 illustrated in FIG. 7 to a state in which it can be accessed via the information communication network 8 and displayed by two-dimensional code display unit 221 (B5). The web page 120 illustrated in FIG. 7 includes the two-dimensional code 111 and the header information 112.

(At the Time of Reading of Two-Dimensional Code)

FIG. 8 illustrates an operation example of the two-dimensional code communication PC 1 illustrated in FIGS. 1 and 2. FIGS. 9 and 10 illustrate an example (a user interface (UI)) of the display screen of the two-dimensional code communication PC 1 illustrated in FIGS. 1 and 2.

In the operation example illustrated in FIG. 8, first, when a user starts a predetermined application (application) with the two-dimensional code communication PC 1 (C1), the conversion unit 11 determines whether a setting file F11 is normal (C2). The setting file F11 is a setting file corresponding to the setting file F1 illustrated in FIG. 3. The setting file F11 is the same file when the setting file F1 is normal. The setting file F11 is stored in a predetermined storage area of the two-dimensional code communication PC 1 at the time of initial setup of the two-dimensional code communication PC 1. A digital certificate F12 which will be described later is a digital certificate forming a pair along with the digital certificate F2 illustrated in FIG. 3. The digital certificate F12 is stored in a predetermined storage area of the two-dimensional code communication PC 1 at the time of initial setup of the two-dimensional code communication PC 1.

The digital certificate F12 forming a pair along with the digital certificate F2 can be issued to have content differing for each industrial plant P1, for each two-dimensional code communication PC 1, for each control object unit such as a power generation unit, or for each of one or more field devices 5 to be controlled. In this case, an encryption key or a decryption key differs for each of one or more control object devices (field devices 5).

A window 130 illustrated in FIG. 9 illustrates an example (a state in which control parameters obtained by converting the two-dimensional code 111 are displayed already) of the display screen of the two-dimensional code communication PC 1. The window 130 includes a button 131 for ending an application, a button 132 for reading a two-dimensional code, and a button 133 for transmitting a control parameter (a button for setting data). The window 130 includes an area 134 for displaying "parameter setting information" corresponding to the header information and a list 135 of control parameters as information which is displayed when the two-dimensional code is converted normally. Each row of the list 135 includes items such as a name 136, a current value 137, and a set value 138 (a value of a new control parameter read from the two-dimensional code 111) of a control parameter.

When the setting file Flt is not stored in the predetermined storage area or the like and thus is not normal (C2: "NO"), the conversion unit 11 displays an error (C15) and restarts the application (C1). When the setting file F11 is normal (C2: "YES"), the conversion unit 11 starts a reading mode (for example, displays an image captured by the imaging device 21) (C3), and when the user puts the two-dimensional code 111 displayed on the two-dimensional code display terminal 22 on a frame of the imaging device 21 (puts a camera), the conversion unit 11 performs reading of a two-dimensional code image and converts the two-dimensional code to a alphanumerical sequence or a numerical sequence (post-conversion input information) (C4).

Then, the conversion unit 11 decrypts an encrypted data part (the encrypted hash value 1111 in FIG. 6) using a decryption key included in the digital certificate F12 (C5). Then, the conversion unit 11 calculates a hash value of the data part (the same information as predetermined information) (C6) and determines whether the hash value calculated in C6 matches the hash value acquired in C5 (C7). The same information as the predetermined information is, for example, data in the same setting file F11 as the setting file F1 or control information and header information included in the post-conversion input information.

When the two hash values match (C7: YES), the conversion unit 11 determines whether the number of target signals (the number of control parameters) is normal (C8) and whether versions of the setting files match (C9) with reference to the setting file Flt and determines whether all the control parameters are not null (blank) (C10). When the number of target signals is normal (C8: YES), the versions of the setting files match (C9: YES), and all the control parameters are not null (C10: YES), the conversion unit 11 reads the control parameters, displays a name 136 and a set value 138 corresponding to each control parameter as a list 135 in the window 130 (C11), and then determines whether communication can be performed normally (C12).

When communication can be performed normally (C12: YES), the conversion unit 11 receives a current value corresponding to each control parameter from the DCS control device 4 and displays the current values 137 corresponding to the control parameters in the list 135 on the window 130 (C13). Here, when the button 133 for transmitting a control parameter (the button for setting data) is clicked, the transmission unit 12 transmits the control parameters to the DCS control device 4 (C14).

On the other hand, when communication cannot be performed normally (C12: NO), the conversion unit 11 displays a predetermined error (C20), displays an error indicating that transmission cannot be performed even when the transmission is performed in a transmission error state (C21), displays a predetermined error again (C22), and then determines whether communication can be performed normally (C12).

On the other hand, when the hash values do not match (C7: NO), the number of target signals is not normal (C8: NO), and the versions of the setting files do not match (C9: NO), or all the control parameters are null (C10: NO), the conversion unit 11 displays an error as illustrated in FIG. 10 (C16 to C19) and restarts the reading mode (C3). In the display example illustrated in FIG. 10, a modal window 140 including an area 141 indicating an error is displayed in the window 130 illustrated in FIG. 9. When a button "OK" 142 is clicked in the display state illustrated in FIG. 10, the reading mode is restarted (C3). The routine illustrated in FIG. 8 is an example and may additionally include, for example, comparing a date and time of the two-dimensional code communication PC 1 with the optimization date and time included in the header information and checking whether it is within a predetermined use period.

(Operations and Advantages)

As described above, according to this embodiment, since a control parameter can be read by only putting the imaging device 21 on a two-dimensional code, for example, it is possible to reduce time and effort in comparison with a case in which a control parameter is manually input or a case in which data is transmitted using a recording medium.

In this embodiment, since there is no physical communication network, it is possible to transmit data from the web server 6 (cloud) to the DCS control device 4 (control device) without taking a security risk.

Effort or time for downloading data to a storage medium or the like or introducing to the control device through a manual operation is not required. Accordingly, it is possible to enhance a degree of real-time control.

Since a device or a communication line other than the web application and the control device is not used, it is possible to secure confidentiality of information.

A signature function in this embodiment can be summarized as follows. First, a two-dimensional code which is generated includes, for example, encrypted information of a hash of data using a certificate stored for each power generation unit in addition to data to be transmitted. When reading of the two-dimensional code is performed in the spot, a certificate forming a pair along with a certificate on the web server 6 (cloud) side is stored in the two-dimensional code communication PC 1, the hash value is decrypted using the certificate, and it is determined whether the decrypted hash value is the same as the hash value of the data part read in the spot. Only when the determination result is positive and reading has been completed normally, data can be transmitted to a DCS network device such as the DCS communication device 3 and the DCS control device 4 through OPC communication or the like. Accordingly, reading fails when a two-dimensional code generated for usage other than a target plant is read. When mismatch from the application side (mismatch in a setting file, mismatch between the number of pieces of data and the number of signals in the setting files, and the like) occurs or lack of setting file information (missing or the like) occurs, reading also fails. When reading fails, for example, a modal window for each error is displayed and transmission to the control device cannot be performed (switching to a main screen is not performed).

As described above, according to this embodiment, since the likelihood of unexpected unauthorized access or malware invasion is zero using a completely contactless method in which a physical communication network is not used, it is possible to provide a method of transmitting information from cloud over the Internet to the DCS while keeping information security policies of power generation companies.

Since a time period until data computed over cloud is reflected in a DCS is much greatly shortened and time and effort of work are reduced in comparison with an offline method in the related art, the method according to this embodiment is more realistic in operation and versatility thereof is broad.

Second Embodiment

Figure 11:
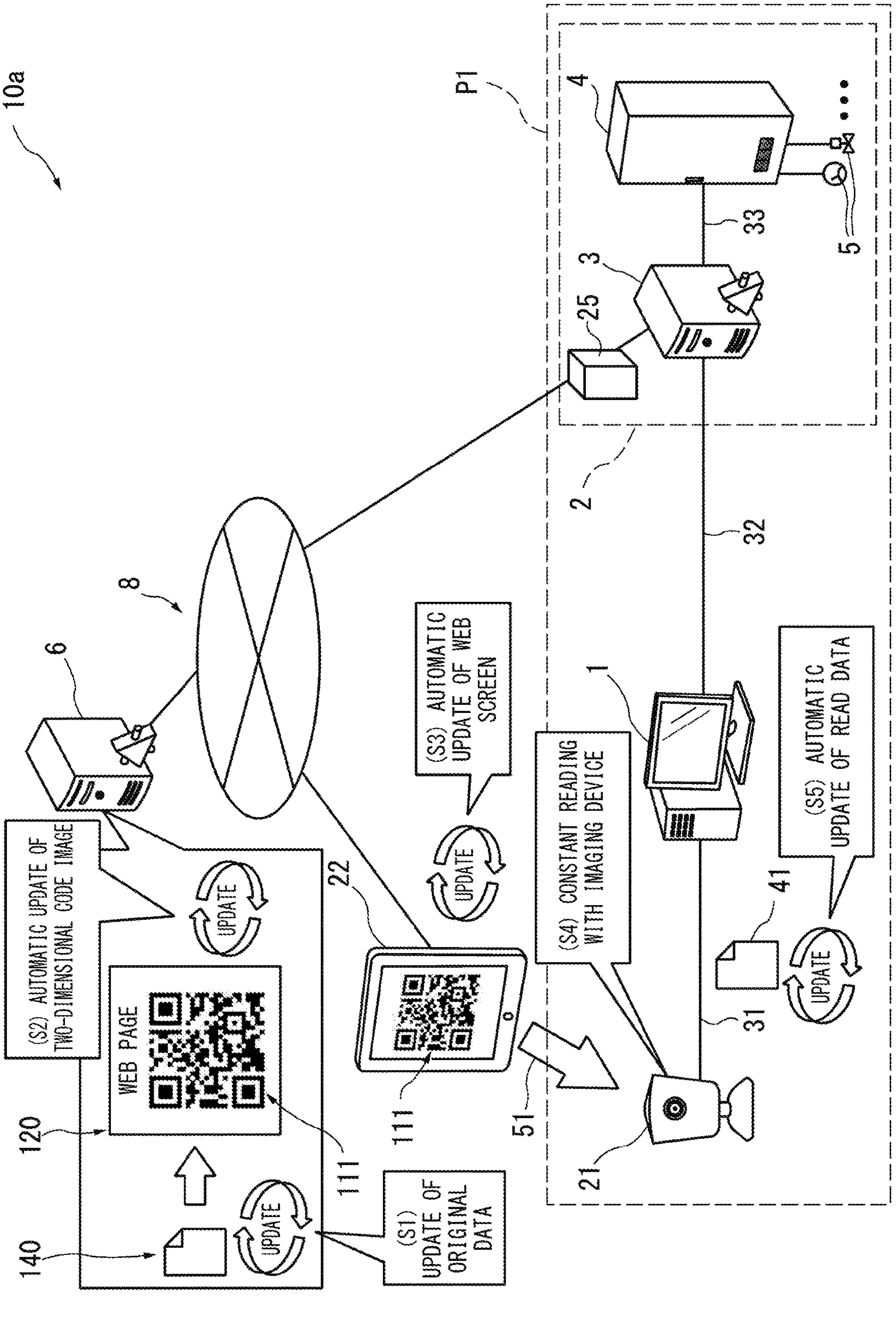
FIG. 11 is a diagram illustrating an example of a configuration of a control system according to a second embodiment of the present disclosure.

A control system, a processing device, and a control method according to a second embodiment of the present disclosure will be described below with reference to FIG. 11. FIG. 11 is a diagram illustrating an example of a configuration of the control system according to the second embodiment of the present disclosure. In FIG. 11, the same or corresponding elements as in FIG. 1 will be referred to by the same reference signs and description thereof will be appropriately omitted.

A control system 10*a* according to the second embodiment is different from the control system 10 according to the first embodiment in that a two-dimensional code 111 is automatically updated. In the control system 10*a* illustrated in FIG. 11, for example, when optimized computation of a control parameter is performed by the web server 6 under an instruction from the two-dimensional code display terminal 22 and original data is updated (S1), a two-dimensional code image is automatically updated (S2), and a web screen is automatically updated (S3). On the other hand, the imaging device 21 constantly performs reading (S4), and read data is automatically updated (S5). When read data is updated, the two-dimensional code communication PC 1 transmits a new control parameter to the DCS control device 4 whenever the control parameter is updated.

According to this embodiment, for example, by automatically updating display of a two-dimensional code on the web application side or omitting a manual authentication operation in the spot, it is also possible to realize immediacy equivalent to online in some usage.

Other Embodiments

While embodiments of the present disclosure have been described above in detail with reference to the drawings, a specific configuration is not limited to the embodiments and include change in design or the like without departing from the gist of the present disclosure.

For example, an image indicating alphanumerical characters, Chinese characters, symbols, or figures may be used as an image generated on the basis of pre-conversion input information instead of an image indicating a two-dimensional code or in addition to an image indicating a two-dimensional code. The image generated on the basis of pre-conversion input information is not limited to display on a display device, but may be printed on a paper medium. The image generated on the basis of pre-conversion input information is not limited to a monochrome image, but may be a color image.

<Computer Configuration>

Figure 12:
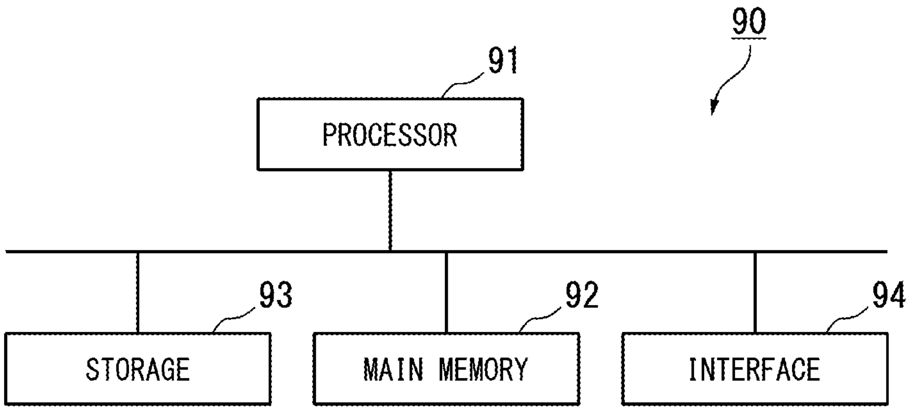
FIG. 12 is a block diagram schematically illustrating a configuration of a computer according to at least one embodiment.

FIG. 12 is a block diagram schematically illustrating a configuration of a computer according to at least one embodiment.

A computer 90 includes a processor 91, a main memory 92, a storage 93, and an interface 94.

The two-dimensional code communication PC 1, the DCS communication device 3, the DCS control device 4, the web server 6, and the two-dimensional code display terminal 22 are mounted in the computer 90. Operations of the processing units are stored in the form of a program in the storage 93. The processor 91 reads a program from the storage 93, loads the program to the main memory 92, and performs the processes in accordance with the program. The processor 91 secures a storage area corresponding to the aforementioned storage units in the main memory 92 in accordance with the program.

The program may realize some functions performed by the computer 90. For example, the program may realize the functions in combination with another program stored in the storage in advance or in combination with another program installed in another device. In another embodiment, the computer may include a customized large scale integrated circuit (LSI) such as a programmable logic device (PLD) in addition to the aforementioned elements or instead of the aforementioned elements. Examples of the PLD include a programmable array logic (PAL), a generic array logic (GAL), a complex programmable logic device (CPLD), and a field-programmable gate array (FPGA). In this case, some or all functions realized by the processor may be realized by the integrated circuit.

Examples of the storage 93 include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 93 may be an internal medium connected directly to a bus of the computer 90 or may be an external medium connected to the computer 90 via the interface 94 or a communication line. When the program is transmitted to the computer 90 via a communication line, the computer 90 having received the program may load the program to the main memory 92 and perform the aforementioned processes. In at least one embodiment, the storage 93 is a non-transitory material storage medium.

<Additional Remark>

The control system 10 or 10*a* according to the embodiments can be understood, for example, as follows.

(1) The control system 10 or 10*a* according to a first aspect is a control system that controls a control object device (the field device 4) on the basis of control information (control parameters) using a control device (the DCS control device 4), the control system including: a conversion unit 11 configured to convert an imaging signal 41 obtained by capturing an image generated on the basis of input information (hereinafter referred to as pre-conversion input information) including the control information to the input information (hereinafter referred to as post-conversion input information); and a transmission unit 12 configured to transmit the control information included in the post-conversion input information to the control device. According to this aspect and the following aspects, it is possible to reduce time and effort.

(2) The control system 10 or 10*a* according to a second aspect is the control system 10 or 10*a* according to (1), wherein the image includes a two-dimensional code.

(3) The control system 10 or 10*a* according to a third aspect is the control system or 10*a* according to (1) or (2), wherein the pre-conversion input information includes the control information, header information including at least a date and time at which the control information has been generated, and an encrypted hash value obtained by encrypting a hash value calculated on the basis of predetermined information (for example, data in the setting file F1 or the control information and the header information included in the pre-conversion input information), the conversion unit 11 determines whether a hash value calculated on the basis of the same information (for example, data in the same setting file Flt as the setting file F1 or the control information and the header information included in the pre-conversion input information) as the predetermined information matches a value obtained by decrypting the encrypted hash value (C7), and the transmission unit 12 transmits the control information included in the post-conversion input information to the control device when it is determined that the two values match. According to this aspect, it is possible to further improve confidentiality.

(4) The control system 10 or 10*a* according to a fourth aspect is the control system 10 or 10*a* according to (3), wherein a key used for the encryption varies between one or more control object devices. According to this aspect, it is possible to further improve confidentiality.

(5) The control system 10 or 10*a* according to a fifth aspect is the control system or 10*a* according to any one of (1) to (4), wherein the control information includes a plurality of control parameters, the control parameters of the control information in the pre-conversion input information are included in the input information on the basis of a setting file in which the number and the listing order of the control parameters are defined, and the conversion unit discerns the control parameters of the control information included in the post-conversion input information on the basis of the setting file.

According to this aspect, it is possible to reduce an amount of data which is imaged.

(6) The control system 10 or 10*a* according to a sixth aspect is the control system 10 or 10*a* according to (5), wherein the conversion unit 11 determines whether the number of control parameters defined in the setting file matches the number of control parameters included in the control information in the post-conversion input information (C8), and the transmission unit 12 transmits the control information included in the post-conversion input information to the control device when it is determined that the two numbers match. According to this aspect, it is possible to further improve confidentiality.

(7) The control system 10*a* according to a second aspect is the control system 10*a* according to any one of (1) to (6), wherein: when the image is updated, the conversion unit 11 converts the imaging signal obtained by capturing the image to the post-conversion input information; and the transmission unit 12 transmits the control information included in the post-conversion input information to the control device.

According to this aspect, it is possible to further reduce a time loss.

INDUSTRIAL APPLICABILITY

According to the aspects of the present disclosure, it is possible to reduce time and effort.

REFERENCE SIGNS LIST

1 Two-dimensional code communication PC
10, 10*a* Control system
2 Distributed control system
3 DCS communication device
4 DCS control device
5 Field device
6 Web server
8 Information communication network
11 Conversion unit
12 Transmission unit
21 Imaging device
22 Two-dimensional code display terminal
31 Universal serial bus
32 Communication network
33 Control network
61 Control parameter computation unit
62 Two-dimensional code creation unit (server side)
63 Two-dimensional code provision unit
221 Two-dimensional code display unit
222 Two-dimensional code creation unit (client side)

The invention claimed is:

1. A control system that controls a control object device on the basis of control information using a control device, the control system comprising:

a processor; and a memory to store a program which, when executed by the processor, the processor performs processes of:

converting an imaging signal obtained by capturing an image generated on the basis of pre-conversion input information which is input information including the control information and header information including at least a date and time at which the control information has been generated to input information which has the same format as the pre-conversion input information and outputting post-conversion input information; and transmitting the control information included in the post-conversion input information to the control device, wherein the control device is configured to control the control object device based on the control information included in the post-conversion input information received by the process of transmitting, and check whether the date and time at which the control information has been generated included in the pre-conversion input information is within a predetermined use period.

2. The control system according to claim 1, wherein the image includes a two-dimensional code.

3. The control system according to claim 1, wherein the pre-conversion input information further includes an encrypted hash value obtained by encrypting a hash value calculated on the basis of predetermined information, wherein the processor further performs the processes of:

determining whether a hash value calculated on the basis of the same information as the predetermined information matches a value obtained by decrypting the encrypted hash value, and transmitting the control information included in the post-conversion input information to the control device when it is determined that the two values match.

4. The control system according to claim 3, wherein a key used for the encryption varies between one or more control object devices.

5. The control system according to claim 1, wherein the control information includes a plurality of control parameters, wherein the control parameters of the control information in the pre-conversion input information are included in the input information on the basis of a setting file in which the number and the listing order of the control parameters are defined, and wherein the processor further performs the process of discerning the control parameters of the control information included in the post-conversion input information on the basis of the setting file.

6. The control system according to claim 5, wherein the processor further performs the processes of:

determining whether the number of control parameters defined in the setting file matches the number of control parameters included in the control information in the post-conversion input information, and transmitting the control information included in the post-conversion input information to the control device when it is determined that the two numbers match.

7. The control system according to claim 1, wherein: when the image is updated, the processor further performs the processes of:

converting the imaging signal obtained by capturing the image to the post-conversion input information; and transmitting the control information included in the post-conversion input information to the control device.

8. A processing device provided in a control system that controls a control object device on the basis of control information using a control device, the processing device comprising:

a processor; and a memory to store a program which, when executed by the processor, the processor performs processes of:

converting an imaging signal obtained by capturing an image generated on the basis of pre-conversion input information which is input information including the control information and header information including at least a date and time at which the control information has been generated to input information which has the same format as the pre-conversion input information and outputting post-conversion input information; and transmitting the control information included in the post-conversion input information to the control device, wherein the processor further performs the process of checking whether the date and time at which the control information has been generated included in the pre-conversion input information is within a predetermined use period.

9. A control method of controlling a control object device on the basis of control information using a control device, the control method for a control system comprising a processor, and a memory to store a program which, when executed by the processor, the processor performs processes of the method comprising:

a step of converting an imaging signal obtained by capturing an image generated on the basis of pre-conversion input information which is input information including the control information and header information including at least a date and time at which the control information has been generated to input information which has the same format as the pre-conversion input information and outputting post-conversion input information; and a step of transmitting the control information included in the post-conversion input information to the control device, wherein, by the control device, the control object device is controlled based on the control information included in the post-conversion input information received in the step of transmitting, and the date and time at which the control information has been generated included in the pre-conversion input information is checked whether within a predetermined use period.

* * * * *